United States Patent
Lash et al.

(10) Patent No.: US 10,620,052 B2
(45) Date of Patent: Apr. 14, 2020

(54) SYSTEM AND METHOD FOR MANUFACTURING CEMENTITIOUS BOARDS WITH ON-LINE VOID DETECTION

(71) Applicant: United States Gypsum Company, Chicago, IL (US)

(72) Inventors: Jason Lash, Valparaiso, IN (US); Scott M. DellAngelo, Plainfield, IL (US); Leslie Eversole, Milton, PA (US)

(73) Assignee: United States Gypsum Company, Chicago, IL (US)

( * ) Notice: Subject to any disclaimer, the term of this patent is extended or adjusted under 35 U.S.C. 154(b) by 101 days.

(21) Appl. No.: 15/199,124

(22) Filed: Jun. 30, 2016

(65) Prior Publication Data

US 2017/0045399 A1    Feb. 16, 2017

Related U.S. Application Data

(60) Provisional application No. 62/203,130, filed on Aug. 10, 2015.

(51) Int. Cl.
*G01J 5/00*     (2006.01)
*B28B 17/00*    (2006.01)
(Continued)

(52) U.S. Cl.
CPC ........ *G01J 5/0022* (2013.01); *B28B 17/0072* (2013.01); *B28B 19/0092* (2013.01);
(Continued)

(58) Field of Classification Search
CPC .... G01J 5/0022; G01J 5/10; G01J 2005/0029; G01J 2005/0077; G01J 2005/0081;
(Continued)

(56) References Cited

U.S. PATENT DOCUMENTS 2,200,155 A * 5/1940 Camp ................ B28B 1/50
                                                      106/680
3,359,146 A   12/1967 Lane et al.
(Continued)

FOREIGN PATENT DOCUMENTS

CA    2887555 A1    4/2014
JP    H06-3303 A    1/1994
(Continued)

OTHER PUBLICATIONS

Durrani et al., "Computer-Aided Thermal Imaging Techniques for the Inspection of Composite Materials," Elsevier Science Publishers B.V. 571-591 (1985).*
(Continued)

*Primary Examiner* — David P Porta
*Assistant Examiner* — Blake C Riddick
(74) *Attorney, Agent, or Firm* — Leydig, Voit & Mayer, Ltd.; Philip T. Petti; Pradip K. Sahu

(57) ABSTRACT

Embodiments of a system and a method for detecting voids in a cementitious board can be used in connection with the manufacture of products, including cementitious board products such as gypsum wallboard, for example. Such systems and methods can be used to generate numerical void measurements based upon a series of thermal images obtained during the continuous manufacture of the cementitious board.

17 Claims, 3 Drawing Sheets

(51) Int. Cl.
*B28B 19/00* (2006.01)
*G01N 25/72* (2006.01)
*G01J 5/10* (2006.01)
*G06T 7/00* (2017.01)

(52) U.S. Cl.
CPC ............... *G01J 5/10* (2013.01); *G01N 25/72* (2013.01); *G06T 7/0008* (2013.01); *G01J 2005/0029* (2013.01); *G01J 2005/0077* (2013.01); *G01J 2005/0081* (2013.01); *G06T 2207/10048* (2013.01); *G06T 2207/30132* (2013.01)

(58) Field of Classification Search
CPC ................... G06T 7/136; G06T 7/0004; G06T 2207/10048; B28B 17/0072; B28B 19/0092; G01N 25/72
USPC ............... 250/330, 336.1, 338.1, 339.04
See application file for complete search history.

(56) References Cited

U.S. PATENT DOCUMENTS

| | | | | |
|---|---|---|---|---|
| 3,362,379 | A * | 1/1968 | Knudtson | B27G 1/00 118/411 |
| 3,553,570 | A * | 1/1971 | Skubiak | G01N 27/9093 324/226 |
| 5,320,677 | A * | 6/1994 | Baig | C04B 11/024 106/772 |
| 5,440,648 | A * | 8/1995 | Roberts | G01N 21/8851 348/133 |
| 5,643,510 | A | 1/1997 | Sucech | |
| 5,683,635 | A | 11/1997 | Sucech et al. | |
| 5,810,010 | A * | 9/1998 | Anbar | A61B 5/015 600/407 |
| 5,834,661 | A | 11/1998 | Nonaka et al. | |
| 5,997,779 | A | 12/1999 | Potter | |
| 6,461,035 | B2 | 10/2002 | Meinlschmidt et al. | |
| 6,494,609 | B1 | 12/2002 | Wittbold et al. | |
| 6,849,851 | B2 | 2/2005 | Komulainen et al. | |
| 6,874,930 | B2 | 4/2005 | Wittbold et al. | |
| 7,007,914 | B2 | 3/2006 | Petersen et al. | |
| 7,064,331 | B2 * | 6/2006 | Rothenfusser | G01N 25/72 250/341.1 |
| 7,296,919 | B2 | 11/2007 | Petersen et al. | |
| 7,513,964 | B2 | 4/2009 | Ritter et al. | |
| 8,462,990 | B2 | 6/2013 | Akashi et al. | |
| 9,194,842 | B2 | 11/2015 | Singh et al. | |
| 9,745,222 | B2 | 8/2017 | Eversole et al. | |
| 2004/0052297 | A1 | 3/2004 | McDonald et al. | |
| 2006/0268153 | A1 * | 11/2006 | Rice | A61B 5/0059 348/370 |
| 2008/0075139 | A1 | 3/2008 | El Jarad et al. | |
| 2008/0155845 | A1 * | 7/2008 | Digavero | B25H 7/02 33/528 |
| 2009/0279080 | A1 * | 11/2009 | Danner | G01N 21/9503 356/237.3 |
| 2010/0074515 | A1 | 3/2010 | Zhao et al. | |
| 2012/0168527 | A1 | 7/2012 | Li et al. | |
| 2012/0170403 | A1 | 7/2012 | Li et al. | |
| 2013/0216717 | A1 | 3/2013 | Rago et al. | |
| 2013/0233880 | A1 | 3/2013 | Rago et al. | |
| 2013/0308411 | A1 | 3/2013 | Wittbold et al. | |
| 2013/0098268 | A1 | 4/2013 | Li et al. | |
| 2013/0099027 | A1 | 4/2013 | Li et al. | |
| 2013/0099418 | A1 | 4/2013 | Li et al. | |
| 2013/0100759 | A1 | 4/2013 | Wittbold et al. | |
| 2013/0192375 | A1 | 8/2013 | Barry et al. | |
| 2015/0064488 | A1 * | 3/2015 | Foster | B32B 9/045 428/514 |
| 2015/0094839 | A1 | 4/2015 | DellAngelo et al. | |
| 2015/0268183 | A1 * | 9/2015 | Yonezawa | G01N 25/72 374/57 |
| 2016/0317983 | A1 * | 11/2016 | Jones | B28B 19/0092 |
| 2016/0328835 | A1 * | 11/2016 | Maresca, Jr. | G01N 21/8851 |

FOREIGN PATENT DOCUMENTS

| | | | |
|---|---|---|---|
| WO | WO 2010/059728 A1 | 5/2010 | |
| WO | WO 2010059728 A1 * | 5/2010 | ............ G01N 21/89 |

OTHER PUBLICATIONS

Burrows, "A Decade's Experience of Gypsum Board Weight Reduction in the U.S.", 14, Internationale Baustofftagung 1.0197-1.0207 (Weimar, Sep. 20-23, 2000).

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, pp. 9-1-9-16 (May 2000).

European Patent Office, International Search Report and the Written Opinion in International Patent Application No. PCT/US2016/045244 (dated Nov. 7, 2016).

European Patent Office, International Preliminary Report on Patentability in International Patent Application No. PCT/US2016/045244 (dated Feb. 22, 2018).

* cited by examiner

SYSTEM AND METHOD FOR MANUFACTURING CEMENTITIOUS BOARDS WITH ON-LINE VOID DETECTION

CROSS-REFERENCE TO RELATED APPLICATION

This patent application claims the benefit of priority to U.S. Provisional Patent Application No. 62/203,130, filed Aug. 10, 2015, and entitled, "System and Method for Manufacturing Cementitious Boards With On-Line Void Detection," which is incorporated in its entirety herein by this reference.

BACKGROUND

The present disclosure relates to continuous board manufacturing processes and, more particularly, to a system and method for detecting voids within a cementitious article during its manufacture.

In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677, for example. Also, many specialty materials, such as materials useful for modeling and mold-making, produce products that contain major amounts of set gypsum. Typically, such gypsum-containing cementitious products are made by preparing a mixture of calcined gypsum (calcium sulfate alpha or beta hemihydrate and/or calcium sulfate anhydrite), water, and other components, as appropriate to form cementitious slurry. In the manufacture of cementitious articles, the cementitious slurry and desired additives are often blended in a continuous mixer, as described in U.S. Pat. No. 3,359,146, for example.

In a typical cementitious article manufacturing process such as wallboard, gypsum board is produced by uniformly dispersing calcined gypsum (commonly referred to as "stucco") in water to form aqueous calcined gypsum slurry. The aqueous calcined gypsum slurry is typically produced in a continuous manner by inserting stucco and water and other additives into a mixer which contains means for agitating the contents to form a uniform gypsum slurry. The slurry is continuously directed toward and through a discharge outlet of the mixer and into a discharge conduit connected to the discharge outlet of the mixer. Aqueous foam can be combined with the aqueous calcined gypsum slurry in the mixer and/or in the discharge conduit. A stream of foamed slurry passes through the discharge conduit from which it is continuously deposited onto a moving web of cover sheet material supported by a forming table.

The foamed slurry is allowed to spread over the advancing web. A second web of cover sheet material is applied to cover the foamed slurry and form a sandwich structure of a continuous wallboard preform, which is subjected to forming, such as at a conventional forming station, to obtain a desired thickness.

The calcined gypsum reacts with the water in the wallboard preform and sets as a conveyor moves the wallboard preform down a manufacturing line. The wallboard preform is cut into segments at a point along the line where the preform has set sufficiently. The segments are flipped over, dried (e.g., in a kiln) to drive off excess water, and processed to provide the final wallboard product of desired dimensions. The aqueous foam produces air voids in the set gypsum, thereby reducing the density of the finished product relative to a product made using a similar slurry but without foam.

During the manufacture of the cementitious board, relatively large voids can form within the manufactured board, such as, by foam coalescing together and/or air becoming entrained within the slurry, for example. Large voids can cause quality problems in the final product, such as cover sheet blows and blisters, for example. Also, larger voids disposed at the edges of the board can cause problems for board installers in that the installer typically applies multiple fasteners along the edges of the board. A larger void at an edge of the board may create a structural weakness that causes the edge to crumble or break when a fastener is inserted through, or near, the larger void located at the edge, for instance.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a system for manufacturing a cementitious board including a system for detecting voids in the cementitious board. For example, in one embodiment, a system for manufacturing a cementitious board is described in which the cementitious board has a cementitious core interposed between a pair of cover sheets. The cementitious board has a pair of edges. The system includes a forming station; a conveyor; a thermal imaging device; a non-transitory, computer-readable medium; and a processor.

The forming station is configured to form the cementitious board such that the cementitious board is within a predetermined thickness range. The conveyor is configured to convey the cementitious board along a machine direction away from the forming station such that the edges of the cementitious board extend along the machine direction and are disposed in lateral spaced relationship to each other along a cross-machine direction. The cross-machine direction is perpendicular to the machine direction.

The thermal imaging device is disposed downstream of the forming station along the machine direction. The thermal imaging device is positioned relative to the conveyor and is configured to generate thermal image data corresponding to a portion of the cementitious board as the cementitious board is conveyed past the thermal imaging device. The thermal imaging device has a field of view with a cross-machine view distance measured along the cross-machine direction. The cross-machine view distance of the thermal imaging device is configured such that the thermal image data includes thermal edge data for both edge segments of the portion of the cementitious board.

The non-transitory, computer-readable medium bears a void detecting program. The processor is in operable arrangement with the thermal imaging device to receive the thermal image data and in operable arrangement with the non-transitory, computer-readable medium. The processor is configured to execute the void detecting program contained on the non-transitory, computer-readable medium. The void detecting program includes a thermal analysis module configured to analyze the thermal image data to identify each void defined within the portion of the cementitious board between the pair of cover sheets that is greater than a predetermined size.

In another aspect of the present disclosure, embodiments of a method of manufacturing a cementitious board including the step of detecting voids in the cementitious board are described. For example, in one embodiment, a method of manufacturing a cementitious board is described.

In the method, the cementitious board is conveyed along a machine direction away from a forming station. The cementitious board has a pair of edges disposed in lateral spaced relationship to each other along a cross-machine direction, which is perpendicular to the machine direction. The edges of the cementitious board extend along the machine direction. The cementitious board has a cementitious core interposed between a pair of cover sheets;

A thermal imaging device is used to generate a digital thermogram of a portion of the cementitious board as the cementitious board is conveyed past the thermal imaging device. The thermal imaging device is disposed downstream of the forming station along the machine direction. The thermal imaging device has a field of view with a cross-machine view distance measured along the cross-machine direction. The cross-machine view distance of the thermal imaging device is configured such that the digital thermogram includes both edge segments of the portion of the cementitious board.

The digital thermogram is transmitted to a processor. The processor executes a void detecting program stored upon a non-transitory, computer-readable medium to subject the digital thermogram to void detection analysis. The void detection analysis includes identifying each void defined within the portion of the cementitious board between the pair of cover sheets that is greater than a predetermined size.

Further and alternative aspects and features of the disclosed principles will be appreciated from the following detailed description and the accompanying drawings. As will be appreciated, the systems and techniques for determining the number and/or size of voids in a cementitious board disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

Figure 1:
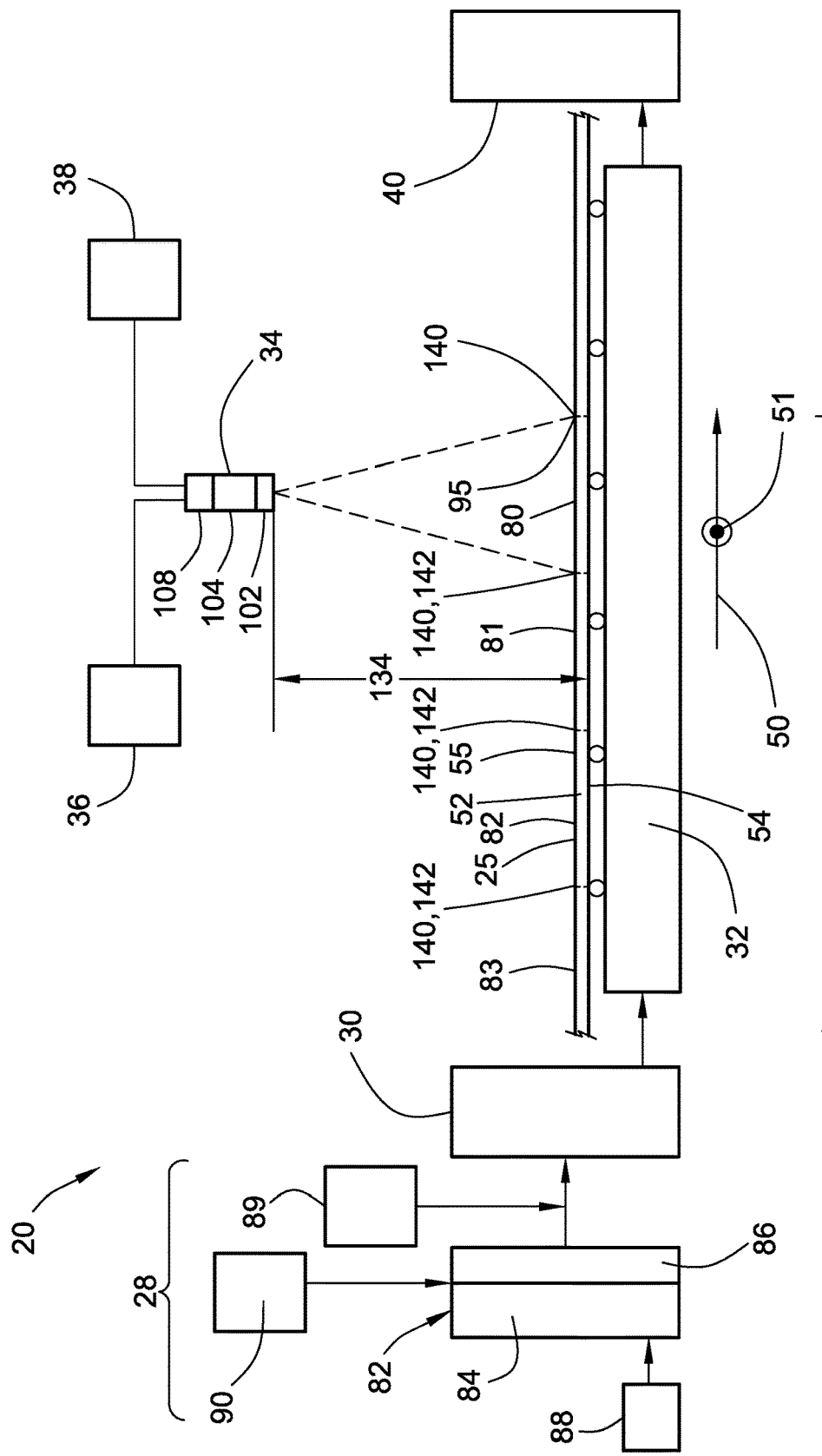
FIG. 1 is a fragmentary, schematic elevational view of an embodiment of a system for manufacturing a cementitious board in the form of a gypsum wallboard manufacturing line including an embodiment of a system for detecting voids in a cementitious board during continuous manufacture thereof which is constructed in accordance with principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

The present disclosure provides various embodiments of a system and a method for detecting voids in a cementitious board during continuous manufacture thereof that can be used in connection with the manufacture of products, including cementitious products, such as gypsum wallboard, for example. Embodiments of a system and a method for detecting voids in a cementitious board during continuous manufacture thereof following principles of the present disclosure can be used online in a continuous manufacturing process to effectively determine the number and/or size of large air void space contained within the cementitious board (e.g., gypsum wallboard) being produced and issue an operator alert when a threshold void limit is exceeded.

Embodiments of a system and a method for detecting voids in a cementitious board during continuous manufacture thereof that follow principles of the present disclosure can be used to produce an objective, numerical value that quantifies the number of voids of a given size range in a predetermined amount of board being produced (e.g., the number of board per thousand square feet ("msf") of board). In embodiments, a system and a method for detecting voids in a cementitious board during continuous manufacture thereof that follow principles of the present disclosure can identify thermal variations over the area of the board being produced to detect voids. In embodiments, the numerical void count generated using principles of the present disclosure can be used to help a line operator control the quality of the board being made.

In one embodiment, a system for manufacturing a cementitious board includes a forming station, a conveyor, a thermal imaging device, a non-transitory, computer-readable medium, and a processor. The cementitious board has a cementitious core interposed between a pair of cover sheets. The cementitious board has a pair of edges.

The forming station is configured to form the cementitious board such that the cementitious board is within a predetermined thickness range. The conveyor is configured to convey the cementitious board along a machine direction away from the forming station such that the edges of the cementitious board extend along the machine direction and are disposed in lateral spaced relationship to each other along a cross-machine direction. The cross-machine direction is perpendicular to the machine direction.

The thermal imaging device is disposed downstream of the forming station along the machine direction. The thermal imaging device is configured to generate thermal image data corresponding to a portion of the cementitious board as the cementitious board is conveyed past the thermal imaging device. The thermal imaging device has a field of view with a cross-machine view distance measured along the cross-machine direction. The cross-machine view distance of the thermal imaging device is configured such that the thermal image data includes thermal edge data for both edge segments of the portion of the cementitious board.

The non-transitory, computer-readable medium bears a void detecting program. The processor is in operable arrangement with the thermal imaging device to receive the thermal image data and is in operable arrangement with the non-transitory, computer-readable medium to execute the void detecting program contained thereon. The void detecting program includes a thermal analysis module configured to analyze the thermal image data to identify each void defined within the portion of the cementitious board between the pair of cover sheets that is greater than a predetermined size.

In one embodiment, a method of manufacturing a cementitious board includes conveying the cementitious board along a machine direction away from a forming station. The cementitious board has a pair of edges. The edges are disposed in lateral spaced relationship to each other along a cross-machine direction, which is perpendicular to the machine direction. The edges of the cementitious board extend along the machine direction. The cementitious board has a cementitious core interposed between a pair of cover sheets.

A thermal imaging device is used to generate a digital thermogram of a portion of the cementitious board as the cementitious board is conveyed past the thermal imaging device. The thermal imaging device is disposed downstream of the forming station along the machine direction. The thermal imaging device has a field of view with a cross-machine view distance measured along the cross-machine direction. The cross-machine view distance of the thermal imaging device is configured such that the digital thermogram includes both edge segments of the portion of the cementitious board.

The digital thermogram is transmitted to a processor. A void detecting program stored upon a non-transitory, computer-readable medium is executed using the processor to subject the digital thermogram to void detection analysis. The void detection analysis includes identifying each void defined within the portion of the cementitious board between the pair of cover sheets that is greater than a predetermined size.

Turning now to the Figures, an embodiment of a system 20 for manufacturing a cementitious board 25 constructed according to principles of the present disclosure is shown in FIG. 1. The illustrated system 20 includes a wet end system 28, a forming station 30, a conveyor 32, a thermal imaging device 34, a controller 36, a processor 38 in operable arrangement with a non-transitory, computer-readable medium bearing a void-detecting program, and a cutting station 40.

The wet end system 28 and the forming station 30 are configured to mix and assemble constituent materials together such that a continuous cementitious board 25 having a predetermined nominal thickness is fed from the forming station 30 along the conveyor 32 in a machine direction 50 toward the cutting station 40.

Figure 2:
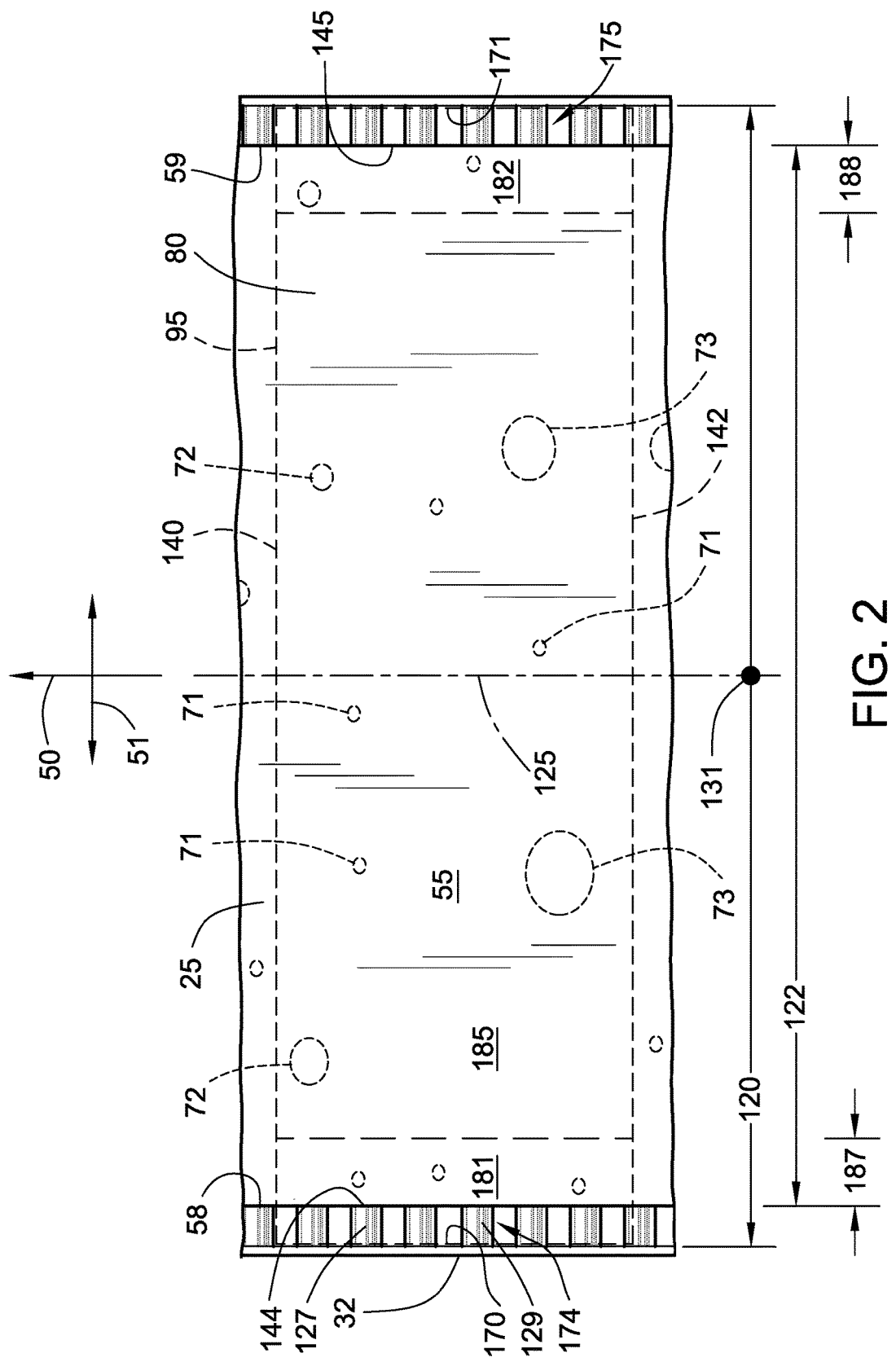
FIG. 2 is a fragmentary, schematic view of an exemplary specimen of a gypsum wallboard segment, illustrating a number of voids therein.

Referring to FIGS. 1 and 2, the cementitious board 25 has a cementitious core 52 interposed between a pair of cover sheets 54, 55. The cementitious board has a pair of edges 58, 59 extending along the machine direction 50. The edges 58, 59 are disposed in lateral spaced relationship to each other along a cross-machine direction 51 which is perpendicular to the machine direction 50. The cementitious board 25 has a number of voids 71, 72, 73 defined within the cementitious board 25 between the cover sheets 54, 55.

In embodiments, the thermal imaging device 34 is in the form of an infrared camera. The cementitious board 25 can be conveyed by the conveyor 32 underneath the thermal imaging device 34 such that thermal image data corresponding to a portion 80 of the cementitious board 25 can be acquired by the thermal imaging device 34 and transmitted to the void-detecting processor 38. The void detecting processor 38 is configured to execute the void-detecting program stored upon the non-transitory, computer-readable medium to evaluate the thermal image data generated by the thermal imaging device 34 in order to determine the number of voids 71, 72, 73 greater than a predetermined size within the cementitious board 25. In embodiments, the number of voids 71, 72, 73 within the cementitious board 25 in each of a number of void size ranges can be determined.

Referring to FIG. 1, the wet end system 28 can include any suitable equipment adapted to mix and/or assemble the constituent materials forming the cementitious board 25. In embodiments, the wet end system 28 is configured as a gypsum wallboard wet end system.

In embodiments, the wet end system 28 includes a cementitious slurry mixing and dispensing system 82 having a slurry mixer 84 in fluid communication with a slurry dispensing system 86. The slurry mixer 84 is adapted to agitate water and a cementitious material (such as, calcined gypsum, for example) to form aqueous cementitious slurry. Both the water and the cementitious material can be supplied to the mixer 84 via one or more inlets as is known in the art. In embodiments, any other suitable slurry additive can be supplied to the mixer 84 as is known in the art of manufacturing cementitious products. Any suitable mixer (e.g., a pin mixer as is known in the art and commercially available from a variety of sources) can be used.

In use, water and a cementitious material, such as calcined gypsum, for example, can be agitated in the mixer 84 to form aqueous cementitious slurry. In some embodiments, water and calcined gypsum can be continuously added to the mixer 84 in a water-to-calcined gypsum ratio from about 0.5 to about 1.3, and in other embodiments of about 0.75 or less.

The slurry dispensing system 86 is in fluid communication with the slurry mixer 84 and is configured to dispense a main flow of cementitious slurry from the slurry mixer 84 upon a forming table extending between the cementitious slurry mixing and dispensing system 82 and the forming station 30. In embodiments, the slurry dispensing system 86 can include a suitable discharge conduit, as is known in the art. The discharge conduit can be made from any suitable material and can have different shapes. In some embodiments, the discharge conduit can comprise a flexible conduit. Cementitious slurry can be discharged from the slurry dispensing system 86 in an outlet flow direction substantially along the machine direction 50.

One or more flow-modifying elements can be associated with the discharge conduit and adapted to modify the flow of aqueous cementitious slurry from the slurry mixer 84 through the discharge conduit 86. The flow-modifying element(s) can be used to control an operating characteristic of the flow of aqueous cementitious slurry. Examples of suitable flow-modifying elements include volume restrictors, pressure reducers, constrictor valves, canisters, etc., including those described in U.S. Pat. Nos. 6,494,609; 6,874,930; 7,007,914; and 7,296,919, for example.

It is further contemplated that other discharge conduits, including other discharge conduits with different slurry distributors or boots, can be used in other embodiments of a cementitious slurry mixing and dispensing system 82. For example, in other embodiments, the discharge conduit 86 can include at its terminal end a slurry distributor similar to one of those shown and described in U.S. Patent Application Nos. 2012/0168527; 2012/0170403; 2013/0098268; 2013/

0099027; 2013/0099418; 2013/0100759; 2013/0216717; 2013/0233880; and 2013/0308411, for example. In some of such embodiments, the discharge conduit 86 can include suitable components for splitting a main flow of cementitious slurry into two flows which are re-combined in the slurry distributor.

A first roll 88 of cover sheet material is configured to be selectively dispensed such that the first cover sheet 54 is dispensed from the first roll 84 upstream of the slurry dispensing system 86 upon the forming table extending between the slurry mixer and dispensing system 82 and the forming station 30. A second roll 89 of cover sheet material is configured to be selectively dispensed such that the second cover sheet 55 is dispensed from the second roll 89 upon the forming table at a position between the slurry dispensing system 86 of the cementitious slurry mixing and dispensing system 82 and the forming station 30 over the first cover sheet 54 and the slurry dispensed from the slurry dispensing system 86. Gypsum board products are typically formed "face down" such that the first cover sheet 54 dispensed from the first roll 88 traveling over the forming table serves as the "face" cover sheet 54 of the finished cementitious board 25.

In embodiments, a foam injection system 90 can be arranged with at least one of the mixer 84 and the slurry dispensing system 86. The foam injection system 90 can include a foam source (e.g., such as a foam generation system configured as known in the art) and a foam supply conduit.

In embodiments, any suitable foam source can be used. Preferably, the aqueous foam is produced in a continuous manner in which a stream of a mix of foaming agent and water is directed to a foam generator, and a stream of the resultant aqueous foam leaves the generator and is directed to and mixed with the cementitious slurry. In embodiments, any suitable foaming agent can be used. Preferably, the aqueous foam is produced in a continuous manner in which a stream of the mix of foaming agent and water is directed to a foam generator, and a stream of the resultant aqueous foam leaves the generator and is directed to and mixed with the slurry. Some examples of suitable foaming agents are described in U.S. Pat. Nos. 5,683,635 and 5,643,510, for example.

The aqueous foam supply conduit can be in fluid communication with at least one of the slurry mixer 84 and the slurry dispensing system 86. An aqueous foam from a source can be added to the constituent materials through the foam supply conduit at any suitable location downstream of the mixer 84 and/or in the mixer 84 itself to form a foamed cementitious slurry. In embodiments, the foam supply conduit is disposed downstream of the slurry mixer 84 and is associated with a main delivery trunk of the discharge conduit 86. In some embodiments, the aqueous foam supply conduit has a manifold-type arrangement for supplying foam to a plurality of foam injection ports defined within an injection ring or block disposed at a terminal end of the foam supply conduit and associated with the discharge conduit 86, as described in U.S. Pat. No. 6,874,930, for example. In embodiments, a flow-modifying element is disposed downstream of the foam injection body and the aqueous foam supply conduit relative to a flow direction of the flow of cementitious slurry from the mixer 84 through the discharge conduit 86.

In other embodiments, one or more foam supply conduits can be provided in fluid communication with the mixer 84. In yet other embodiments, the aqueous foam supply conduit (s) can be in fluid communication with the slurry mixer 84 alone. As will be appreciated by those skilled in the art, the means for introducing aqueous foam into the cementitious slurry in the cementitious slurry mixing and dispensing system 82, including its relative location in the system, can be varied and/or optimized to provide a uniform dispersion of aqueous foam in the cementitious slurry to produce board that is fit for its intended purpose.

In embodiments in which the cementitious slurry comprises gypsum slurry, one or both of the cover sheet 54, 55 can be pre-treated with a very thin relatively denser layer of gypsum slurry (relative to the gypsum slurry comprising the core), often referred to as a "skim coat" in the art, and/or hard edges, if desired. To that end, in embodiments, the mixer 84 can include a first auxiliary conduit that is adapted to deposit a stream of dense aqueous cementitious slurry that is relatively denser than the main flow of aqueous calcined gypsum slurry delivered to the discharge conduit 86 (i.e., a "face skim coat/hard edge stream").

In embodiments, a hard edge/face skim coat roller is disposed upstream of the slurry dispensing system 86 of the cementitious slurry mixing and dispensing system 82 and supported over the forming table such that the first cover sheet 54 being dispensed from the first roll 88 is disposed therebetween. The first auxiliary conduit can deposit the face skim coat/hard edge stream upon the first cover sheet 54 being dispensed from the first roll 88 upstream of the skim coat roller which is adapted to apply a skim coat layer to the moving first cover sheet 54 and to define hard edges at the periphery of the moving first cover sheet 54 by virtue of the width of the roller being less than the width of the moving first cover sheet 54 as is known in the art. Hard edges can be formed from the same dense slurry that forms the thin dense layer by directing portions of the dense slurry around the ends of the roller used to apply the dense layer to the first cover sheet 54.

In some embodiments, a back skim coat roller is disposed over a support element such that the second cover sheet 55 being dispensed from the second roll 89 is disposed therebetween. The mixer can also include a second auxiliary conduit adapted to deposit a stream of dense aqueous calcined gypsum slurry that is relatively denser than the main flow of aqueous calcined gypsum slurry delivered to the discharge conduit 86 (i.e., a "back skim coat stream"). The second auxiliary conduit can deposit the back skim coat stream upon the moving second cover sheet 55 upstream (in the direction of movement of the second cover sheet 55) of the back skim coat roller that is adapted to apply a skim coat layer to the second cover sheet 55 being dispensed from the second roll 89 as is known in the art.

In other embodiments, separate auxiliary conduits can be connected to the mixer 84 to deliver one or more separate edge streams to the moving cover sheet. Other suitable equipment (such as auxiliary mixers) can be provided in the auxiliary conduits to help make the slurry therein denser, such as by mechanically breaking up foam in the slurry and/or by chemically breaking down the foam through use of a suitable de-foaming agent.

The skim coat rollers, the forming table, and the support element can all comprise equipment suitable for their respective intended purposes as is known in the art. The wet end system 28 can be equipped with other suitable equipment as is known in the art.

In use, the first cover sheet 54 is dispensed from the first roll 84 and moves along the machine direction 50. The cementitious slurry is discharged from the discharge conduit 86 upon the moving first cover sheet 54. The face skim coat/hard edge stream can be deposited from the mixer 84 at a point upstream of where the cementitious slurry is discharged from the discharge conduit 86 upon the moving first cover sheet 54 relative to the direction of movement of the first cover sheet 54 in the machine direction 50. A back skim coat stream (a layer of denser slurry relative to the main flow of cementitious slurry being discharged from the discharge conduit 86) can be applied to the second cover sheet 55 being dispensed from the second roll 89. The back skim coat stream can be deposited from the mixer 84 at a point upstream of the back skim coat roller relative to the direction of movement of the moving second cover sheet 55. In embodiments, aqueous foam or other agents can be added to the slurry comprising the face skim coat and/or back skim coat to reduce its density, but at a density that is greater than the foamed slurry dispensed from the discharge conduit.

The moving second cover sheet 55 can be placed upon the slurry deposited upon the advancing first cover sheet 54 to form a sandwiched wallboard preform that is fed to the forming station 30 to shape the preform to a desired thickness.

The forming station 30 is configured to form the cementitious board 25 such that the cementitious board 25 is within a predetermined thickness range. The forming station 30 can comprise any equipment suitable for its intended purpose as is known in the art.

The conveyor 32 is configured to convey the cementitious board 25 along the machine direction 50 away from the forming station 30 such that the edges of the cementitious board extend along the machine direction 50. In embodiments, the conveyor 32 is configured such that it has a length, measured along the machine direction 50, sufficient to allow the cementitious slurry constituting the cementitious core 52 to adequately set before reaching the cutting station 40 such that the cementitious board 25 can be cut. The temperature of the cementitious slurry rises during the setting process, which is an exothermic reaction that generates heat.

In embodiments, the thermal imaging device 34 can be any suitable device configured to generate thermal data corresponding to the cementitious board 25. The illustrated thermal imaging device 34 is disposed downstream of the forming station 30 along the machine direction 50 and is disposed between the forming station 30 and the cutting station 40. The illustrated thermal imaging device 34 is configured to generate thermal image data corresponding to the portion 80 of the cementitious board 25 within a field of view 95 of the thermal imaging device 34 as the cementitious board is conveyed from the forming station 30 along the machine direction 50 past the thermal imaging device 34 toward the cutting station 40.

The thermal imaging device is in operable arrangement with the controller 36 and the processor 38. The thermal imaging device 34 can be configured to selectively operate, in response to receiving periodic command signals from the controller, to take a successive series of thermal images (or thermograms) of adjacent portions of the cementitious board 25. The thermal imaging device 34 can be configured to transmit the thermal image data corresponding to each of the thermograms obtained by the thermal imaging device to the processor 38.

In embodiments, the thermal imaging device 34 is in the form of an infrared camera which is configured to produce a digital thermal image of the cementitious board 25 as it travels past the infrared camera 34. In embodiments, the thermal imaging device 34 can be a suitable, commercially-available infrared camera, such as one from FLIR Systems, Inc., of Wilsonville, Oreg., for example.

The infrared camera 34 can be configured to detect infrared radiant energy (heat) and convert the detected thermal energy values into an electronic signal, which is then processed to produce thermal image data. The processor 38 can use the thermal image data, for example, to perform void-detection analysis and/or to display a thermal image on a display device such as a video monitor.

In embodiments, the infrared camera 34 can include a lens 102, an array 104 of infrared-detector elements, and a signal-processing unit 108, for example.

The lens 102 can be configured to focus the infrared light emitted by all of the objects in the field of view 95 of the infrared camera 34. The lens 102 is configured to transmit the infrared energy emitted by the objects in the field of view 95 to the array 104 of infrared-detector elements.

The array 104 of infrared-detector elements can comprise a matrix of suitable infrared-detector elements, each of which being configured to detect infrared radiation from objects within a corresponding area of the field of view 95 of the infrared camera 34. In embodiments, the infrared camera 34 can include any suitable type of infrared detector arrangement, such as, a focal plane array (FPA). The focused infrared light is scanned by the array 104 of infrared-detector elements. The array 104 of infrared-detector elements creates a very detailed temperature pattern, called a thermogram, over the field of view 95. In embodiments, the array 104 of infrared-detector elements can be configured such that the detector array 104 can capture temperature information for a given portion 80 of the cementitious board 25 as the cementitious board 25 moves along the conveyor 32 in the machine direction 50.

The detector array 104 can be configured to obtain temperature information to generate a thermogram having a number of digital pixel points uniformly arranged over the field of view 95. The detector array 104 can be configured to translate the infrared light it detects within the field of view 95 into an electric thermal image signal. The electrical impulses from all of the elements in the array 104 of infrared-detector elements can be used to create the electric thermal image signal. The thermal image signal can be delivered to the signal-processing unit 108.

The signal-processing 108 can be configured to perform signal conditioning steps, such as, for example, corrections for the inherent offset, gain drift, etc., as will be appreciated by one skilled in the art. The signal-processing unit 108 can be configured to convert the thermal image signal received from the detector array 104 into thermal image data, including temperature measurement data, for the processor 38. The infrared camera 34 can include, or be connected to, a suitable power source that is configured to selectively operate the components of the infrared camera 34.

In embodiments, the signal-processing unit 108 can send the thermal image data to a display. In the display, the thermogram can be displayed as a variety of colors depending on the intensity of the infrared emission at a given location. The display can include a legend correlating the set of possible colors to a temperature range suitable for the particular thermal image data being displayed.

In embodiments, the thermogram can be displayed with a color distribution between temperatures in the thermal image with a color span that is linear, non-nonlinear, or is assigned according to a color distribution algorithm. In embodiments, the color distribution algorithm can be adapted to generate the color distribution based on either the entire thermal image content or a subset of the entire thermal image content.

In embodiments, the infrared camera 34 can also include a display for a user to view thermal images (or thermograms) generated by the infrared camera 34 based on the infrared energy detected by the detector array 104. The infrared camera 34 can be configured to convert the amount of infrared radiation (or heat) sensed by the infrared-detector array 104 into a suitable digital image of the portion 80 of the cementitious board 25 disposed within the field of view 95. In embodiments, the thermal images can be stored in a storage device of the infrared camera 34 or transmitted (e.g., via a wireless or wired network) to the processor 38 for remote viewing and/or storage.

In embodiments, the signal-processing unit 108 can be provided as one physical unit, or alternatively as a plurality of logically interconnected units. The signal-processing unit 108 can include logic for performing the functionality of the infrared camera 34, which can be implemented by means of a computer program. The signal-processing unit 108 can include a storage device or a memory unit for storing such a computer program and processing means or a processing unit, such as a microprocessor, for executing the computer program. The storage device can include a readable storage medium connected to the signal-processing unit 108.

Referring to FIGS. 1 and 2, the field of view 95 of the thermal imaging device 34 has a cross-machine view distance 120, which is measured along the cross-machine direction 51. The portion 80 of the cementitious board 25 within the field of view 95 has a cross-machine board distance 122, also measured along the cross-machine direction 51. The thermal imaging device 34 is positioned relative to the cementitious board 25 and the field of view 95 of the thermal imaging device 34 is configured such that the cross-machine view distance 120 of the field of view 95 is greater than the cross-machine board distance 122 of the portion 80 of the cementitious board 25 within the field of view 95.

The conveyor 32 has a conveyor longitudinal midline 125 which extends along the machine direction 500 at a lateral midpoint (along the cross-machine direction 51) of a support surface 127 defined by a plurality of rollers 129 of the conveyor 32 journaled for rotation. The cross-machine view distance 120 has a transverse midpoint 131 along the cross-machine direction 51. In embodiments, the transverse midpoint 131 of the field of view 95 of the thermal imaging device 34 is substantially aligned with the conveyor longitudinal midline 125 of the conveyor 32.

Referring to FIG. 1, the thermal imaging device 34 is disposed over the conveyor 32 at a predetermined thermal imaging device height 134, measured between the thermal imaging device 34 and the support surface 127 of the conveyor 32. In embodiments, a ratio of: (1) the thermal imaging device height 134 to (2) the cross-machine board distance 122 of the portion 80 of the cementitious board 25 within the field of view 95 is less than or equal to two and one-half, and, in other embodiments, is less than or equal to two, and less than or equal to one and one-half in still other embodiments. In yet other embodiments, the ratio of: (1) the thermal imaging device height 134 to (2) the cross-machine board distance 122 of the portion 80 of the cementitious board 25 within the field of view 95 is in a range between one and two and one-half, and in a range between one and two in yet other embodiments. In one embodiment, the thermal imaging device height 134 is about six feet and the cross-machine board distance 122 is in a range between forty-eight inches and fifty-four inches.

Referring to FIG. 2, the portion 80 of the cementitious board 25 within the field of view 95 includes a leading end 140 and a trailing end 142 disposed in longitudinal spaced relationship to each other along the machine direction 50 and a pair of edge segments 144, 145 disposed in lateral spaced relationship to each other along the cross-machine direction 51. The cross-machine view distance 120 of the field of view 95 of the thermal imaging device 34 is configured such that the thermal image data includes thermal edge data for both edge segments 144, 145 of the portion 80 of the cementitious board 25 within the field of view 95. In other words, the field of view 95 of the thermal imaging device 34 is configured such that thermal image data is obtained over the entire width, measured along the cross-machine direction 51, of the portion 80 of the cementitious board 25 being analyzed by the thermal imaging device 34.

Referring to FIG. 1, the controller 36 is in operable arrangement with the thermal imaging device 34. In embodiments, the controller 36 is configured to selectively operate the thermal imaging device 34 to generate thermal image data corresponding to a series of portions 80, 81, 82, 83 of the cementitious board 25 as the cementitious board 25 passes underneath the thermal imaging device 34. The portions 80, 81, 82, 83 of the cementitious board 25 are in offset longitudinal relationship with respect to each other along the machine direction 50.

In embodiments, the controller 36 is configured to selectively operate the thermal imaging device 34 to generate a series of digital thermograms of a number of consecutively-sequenced portions 80, 81, 82, 83 of the cementitious board 25. In embodiments, the controller 36 can be configured such that the portions 80, 81, 82, 83 are arranged such that thermal image data is obtained in an uninterrupted stream 150 along the machine direction 50. In embodiments, the controller 36 is arranged with a line speed sensor, such as through a board line processor configured to monitor and control the board line operations. The controller 36 can determine the time interval between successive thermal image capture operations based upon the measured speed of the cementitious board 25 received via the line speed sensor such that contiguous thermal image data is obtained by the thermal imaging device 34.

In embodiments, the leading end 140 of each respective trailing portion of the consecutively-sequenced portions 80, 81, 82, 83 is substantially aligned with the trailing end 142 of the respective leading portion of the consecutively-sequenced portions 80, 81, 82, 83. For example, the leading end 180 of the second portion 81 is substantially aligned with the trailing end 142 of the first portion 80, and the leading end 180 of the third portion 82 is substantially aligned with the trailing end 142 of the second portion 81.

In embodiments, the controller 36 can include a user input and/or interface device having one or more user actuated mechanisms (e.g., one or more push buttons, slide bars, rotatable knobs, a keyboard, and a mouse) adapted to generate one or more user actuated input control signals. In embodiments, the controller 36 can be configured to include one or more other user-activated mechanisms to provide various other control functions for the thermal imaging device 34, such as, auto-focus, field of view adjustment, brightness, contrast, gain, offset, spatial, temporal, and/or various other features and/or parameters as will be appreciated by one skilled in the art. The controller 36 can include a display device adapted to display a graphical user interface. The graphical user interface can be configured to function as both a user input device and a display device in embodiments. In embodiments, the display device can comprise a touch screen device adapted to receive input signals from a user touching different parts of the display screen. In embodiments, the controller 36 can be in the form of a smart phone, a tablet, a personal digital assistant (e.g., a wireless, mobile device), a laptop computer, a desktop computer, or other type of device.

The void detecting processor 38 is in operable arrangement with the thermal imaging device 34 to receive the thermal image data and is in operable arrangement with the non-transitory, computer-readable medium to execute the void detecting program contained thereon. The void detecting program includes a thermal analysis module configured to analyze the thermal image data to identify each void defined within the portion of the cementitious board between the pair of cover sheets that is greater than a predetermined size. The processor 38 can be configured to receive input signals from the controller 36, to send input control signals to the controller 36, and/or to send output information to the controller 36.

The void detecting processor 38 is operably arranged with the thermal imaging device 34 to receive digital thermal image information from the thermal imaging device 34. The void detecting processor 38 is configured to manipulate the thermal image information received from the thermal imaging device 34, to convert that information into a thermal image which can be stored in a data storage device operably arranged with the void detecting processor 38, and to transmit the thermal image data to the void detecting program to analyze the number of voids 71, 72, 73 within the portion 80 of the cementitious board 25 to which the thermal image data relates.

In embodiments, the void detecting processor 38 can comprise any suitable computing device, such as, a microprocessor, a mainframe computer, a digital signal processor, a portable computing device, a personal organizer, a device controller, a logic device (e.g., a programmable logic device configured to perform processing functions), a digital signal processing (DSP) device, or a computational engine within an appliance. In embodiments, the void detecting processor 38 includes one or more input devices (e.g., a keyboard and a mouse) and a display device.

The void detecting processor 38 can have one or more memory devices associated therewith to store data and information. The one or more memory devices can include any suitable type, including volatile and non-volatile memory devices, such as RAM (Random Access Memory), ROM (Read-Only Memory), EEPROM (Electrically-Erasable Programmable Read-Only Memory), flash memory, etc. In one embodiment, the void detecting processor 38 is adapted to execute programming stored upon a non-transitory computer readable medium to perform various methods, processes, and modes of operations in a manner following principles of the present disclosure.

In embodiments, a void detecting program following principles of the present disclosure can be configured to implement an embodiment of a void detection system according to principles of the present disclosure. In embodiments, the void detecting program includes a graphical user interface that can be displayed by the display device. The graphical user interface can be used to facilitate the inputting of commands and data by a user to the void detecting program and to display outputs generated by the void detecting program.

The void detecting program can be stored upon any suitable computer-readable storage medium. For example, in embodiments, a void detecting program following principles of the present disclosure can be stored upon a hard drive, floppy disk, CD-ROM drive, tape drive, zip drive, flash drive, optical storage device, magnetic storage device, and the like.

In embodiments, the void detecting program is configured to: group each identified void 71, 72, 73 into one of a number of different size ranges. For example, in embodiments, the void detecting program groups each identified void 71, 72, 73 into one of the following groups: voids 71 having a void area between one-half and one square inch; voids 72 having a void area between one square inch and one and one-half square inches; and voids 73 having a void area greater than one and one-half square inches. In embodiments, areas of the cementitious board 25 that are determined to have a void area greater than a predetermined size (e.g., greater than two and one-half square inches) can be excluded from the void analysis as likely being attributable to an anomaly causing a variant in the thermal image (e.g., as one caused by a pool of water collected on top of the board) rather than an actual void within the cementitious board 25.

Referring to FIG. 2, the field of view 95 includes a pair of lateral thermogram edges 170, 171. A pair of crop portions 174, 175 is respectively defined between the lateral thermogram edges 170, 171 of the field of view 95 and the edge segments 144, 145 of the portion 80 of the cementitious board 25. Each crop portion 174, 175 extends longitudinally along the machine direction 50 between the leading end 140 and the trailing end 142 of the portion 80 of the cementitious board 25 within the field of view 95. In embodiments, the void detecting program includes a digital thermogram sizing module configured to exclude each edge crop portion 174, 175 from the void detection analysis of the thermal image data.

In embodiments, the thermal image data includes a temperature value for each of a plurality of digital pixels in the field of view 95. The thermal analysis module of the void detecting program can be configured to: compute an average temperature for a number of the temperature values corresponding to a set of the digital pixels covering an analyzed portion of the field of view, compare each temperature value in the set of the digital pixels with the average temperature, for each digital pixel in the set of the digital pixels, identify the digital pixel as a void pixel when the temperature value of the digital pixel is a predetermined amount less than the average temperature, group adjacent void pixels together to determine the size of a given void 71, 72, 73.

In embodiments, the void detecting program can be configured to track a lateral location of each void 71, 72, 73 along the cross-machine direction 51 relative to the edge segments 144, 145 of the portion 80 of the cementitious board 25. In embodiments, the void detecting program is configured to: group each identified void into one of a first edge area 181, a second edge area 182, and a field area 185. The field area 185 is laterally interposed between the first edge area 181 and the second edge area 182 along the cross-machine direction 51. Each of the first edge area 181, the second edge area 182, and the field area 185 extends along the machine direction 50 from the leading end 140 to the trailing end 141 of the portion 80 of the cementitious board 25.

In embodiments, the first edge area 181 extends a first edge distance 187 from the first edge segment 144 toward the second edge segment 145 along the cross-machine direction 51. The second edge area 182 extends a second edge distance 188 from the second edge segment 145 toward the first edge segment 144 along the cross-machine direction 51. In embodiments, the first edge distance 187 is substantially the same as the second edge distance 188. In other embodiments, the second edge distance 188 can be different from the first edge distance 187. In embodiments, the field area 185 can be divided into smaller segments, as well.

In embodiments, the void detecting program can be configured to issue an alert that is displayed upon a display device via a graphical user interface, for example, when the number of voids for a given size of cementitious board exceeds a predetermined number. In embodiments, the void detecting program can issue a warning when the number of voids for a given size of cementitious board exceeds a predetermined number for one of the first edge area 181, the second edge area 182, and the field area 185.

For example, in embodiments, the void detecting program is configured to aggregate a number of consecutively-sequenced portions that have an aggregated area measured along the machine direction and the cross-machine direction (e.g., one thousand square feet). The void detecting program can be configured to aggregate each void greater than a predetermined size in each of the consecutively-sequenced portions to determine an aggregated void number for the aggregated area. For example, in embodiments, the void detecting program can be configured to calculate the number of voids having a particular size range per thousand square feet of cementitious board 25 prepared. In embodiments, the void detecting program can be configured to group the voids 71, 72, 73 detected within an aggregated area into one of a number of void size ranges.

Referring to FIG. 1, the cutting station 40 is disposed downstream of the forming station 30 along the machine direction 50. The cutting station 40 is arranged with respect to the conveyor 32 such that the conveyor 32 carries the cementitious board 25 past the cutting station 40. The cutting station 40 can include a knife configured to periodically cut the cementitious board 25 along the cross-machine direction 51 to define a series in board segments as the cementitious board 25 moves along the machine direction 50 past the cutting station 40. In embodiments, the knife can be a rotary knife as are generally known to those skilled in the art.

In embodiments, the system 20 for manufacturing a cementitious board 25 can include other components and stations. For example, in embodiments, the system 20 can include a transfer system, including a board inverter; a kiln; and a bundler and taping station, all downstream of the cutting station 40.

Figure 3:
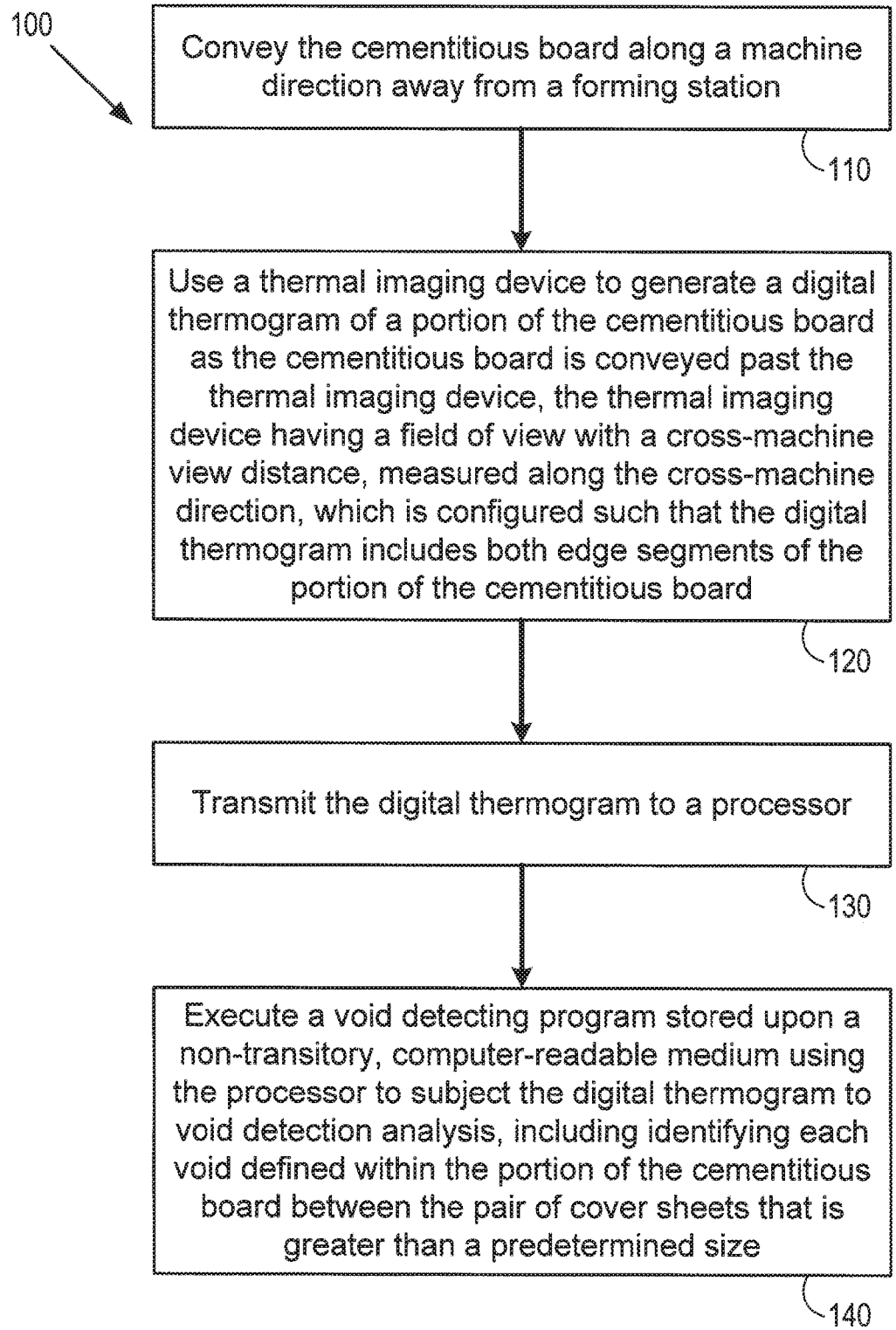
FIG. 3 is a flowchart illustrating steps of an embodiment of a method of detecting voids in a cementitious board during continuous manufacture thereof following principles of the present disclosure.

In embodiments of a method of manufacturing a cementitious board following principles of the present disclosure, a void detection system according to principles of the present disclosure is used to monitor the number and/or size of voids within the cementitious board in an on-line manner during the continuous manufacture of the cementitious board. Referring to FIG. 3, steps of an embodiment of a method 100 of manufacturing a cementitious board following principles of the present disclosure are shown. In embodiments, a method of manufacturing a cementitious board following principles of the present disclosure can be used with any embodiment of a void detection system according to principles discussed herein.

The illustrated method 100 of manufacturing a cementitious board includes conveying the cementitious board along a machine direction away from a forming station (step 110). The cementitious board has a pair of edges. The edges are disposed in lateral spaced relationship to each other along a cross-machine direction, which is perpendicular to the machine direction. The edges of the cementitious board extend along the machine direction. The cementitious board has a cementitious core interposed between a pair of cover sheets.

A thermal imaging device is used to generate a digital thermogram of a portion of the cementitious board as the cementitious board is conveyed past the thermal imaging device (step 120). The thermal imaging device is disposed downstream of the forming station along the machine direction. The thermal imaging device has a field of view with a cross-machine view distance measured along the cross-machine direction. The cross-machine view distance of the thermal imaging device is configured such that the digital thermogram includes both edge segments of the portion of the cementitious board.

The digital thermogram is transmitted to a processor (step 130). A void detecting program stored upon a non-transitory, computer-readable medium is executed using the processor to subject the digital thermogram to void detection analysis (step 140). The void detection analysis includes identifying each void defined within the portion of the cementitious board between the pair of cover sheets that is greater than a predetermined size.

In embodiments, the portion of the cementitious board comprises a first portion, and the digital thermogram of the first portion of the cementitious board comprises a first digital thermogram. In embodiments, the method further includes using the thermal imaging device to generate a second digital thermogram of a second portion of the cementitious board. The second portion of the cementitious board is in offset longitudinal relationship with the first portion along the machine direction.

In embodiments, the digital thermogram includes a temperature value for each of a plurality of digital pixels in the digital thermogram. The void detection analysis can include: computing an average temperature for a number of temperature values generated respectively corresponding to the digital pixels within an array of the digital pixels covering an analyzed portion of the digital thermogram, comparing each temperature value in the array of digital pixels with the average temperature, for each digital pixel in the array of digital pixels, identifying the digital pixel as a void pixel when the temperature value of the digital pixel is a predetermined amount less than the average temperature, grouping adjacent void pixels together to determine the size of a given void.

In embodiments, the void detection analysis includes: grouping each identified void into one of a number of different size ranges. In embodiments, the void detection analysis includes: tracking a lateral location of each void along the cross-machine direction relative to the edge segments of the portion of the cementitious board.

In embodiments, the edge segments of the cementitious board comprise first and second edge segments. The void detection analysis can include: grouping each identified void into one of a first edge area, a second edge area, and a field area. The first edge area extends a predetermined distance from the first edge segment toward the second edge segment along the cross-machine direction, and the second edge area extends a predetermined distance from the second edge segment toward the first edge segment along the cross-machine direction. The field area is laterally interposed between the first edge area and the second edge area along the cross-machine direction. Each of the first edge area, the second edge area, and the field area extends along the machine direction from a leading end to a trailing end of the portion of the cementitious board.

In embodiments, the thermal imaging device is positioned relative to the cementitious board and the field of view of the thermal imaging device is configured such that the cross-machine view distance of the thermal imaging device is greater than a cross-machine board distance of the portion of the cementitious board, which is measured along the cross-machine direction between the edge segments of the portion of the cementitious board. In embodiments, the digital thermogram includes at least one edge crop portion defined between one of a pair of lateral thermogram edges extending along the machine direction and the respective edge segment of the portion of the cementitious board closest to said lateral thermogram edge. The void detecting program excludes each edge crop portion from the void detection analysis of the digital thermogram.

In embodiments, the thermal imaging device is used to generate a series of digital thermograms of a number of consecutively-sequenced portions of the cementitious board as the cementitious board passes underneath the thermal imaging device. Each portion of the cementitious board includes a leading end and a trailing end. The leading end of each portion is in spaced relationship to the respective trailing end along the machine direction. The leading end and the trailing end each extends along the cross-machine direction between the first edge segments. The leading end of each respective trailing portion of the consecutively-sequenced portions is substantially aligned with the trailing end of the respective leading portion of the consecutively-sequenced portions.

In embodiments, consecutively-sequenced portions have an aggregated area measured along the machine direction and the cross-machine direction. The void detection analysis can include aggregating each void greater than a predetermined size in each of the consecutively-sequenced portions to determine an aggregated void number for the aggregated area (e.g., voids per thousand square feet (voids/msf) of cementitious board).

In embodiments, conveying the cementitious board along the machine direction includes lateral movement of the cementitious board in the cross-machine direction such that second edge segments of one portion of the cementitious board have a different lateral position when that portion is within the field of view of the thermal imaging device relative to the respective edge segments of another portion of the cementitious board when that other portion of the cementitious board is within the field of view. The field of view of the thermal imaging device can be configured such the edge segments of the cementitious board within both portions of the cementitious board are included in the respective digital thermogram. In other words, the thermal imaging device can be configured to accommodate relative lateral movement of various portions of the cementitious board during its continuous manufacture while maintaining the respective edge segments of the cementitious board within the field of view of the thermal imaging device to obtain thermal data across the entire width of the cementitious board, as measured along the cross-machine direction.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for manufacturing a cementitious board, the cementitious board having a cementitious core interposed between a pair of cover sheets, the cementitious board having first and second edge segments, the cementitious core including a main portion and first and second edges, the main portion being laterally interposed between the first and second edges, the main portion being made from a main slurry, and the first and second edges being made from an edge slurry the edge slurry being relatively denser than the main slurry, the system comprising:

a forming station, the forming station configured to form the cementitious board such that the cementitious board is within a predetermined thickness range;

a conveyor, the conveyor configured to convey the cementitious board along a machine direction away from the forming station such that the first and second edge segments of the cementitious board extend along the machine direction and are disposed in lateral spaced relationship to each other along a cross-machine direction, the cross-machine direction being perpendicular to the machine direction;

a thermal imaging device, the thermal imaging device disposed downstream of the forming station along the machine direction, the thermal imaging device being positioned relative to the conveyor and being configured to generate thermal image data corresponding to a portion of the cementitious board as the cementitious board is conveyed past the thermal imaging device, the thermal imaging device having a field of view with a cross-machine view distance measured along the cross-machine direction, the cross-machine view distance of the thermal imaging device configured such that the thermal image data includes thermal edge data for both the first and second edge segments of the portion of the cementitious board;

a non-transitory, computer-readable medium, the non-transitory, computer-readable medium bearing a void detecting program;

a processor, the processor in operable arrangement with the thermal imaging device to receive the thermal image data and in operable arrangement with the non-transitory, computer-readable medium, the processor configured to execute the void detecting program contained on the non-transitory, computer-readable medium;

a cutting station, the cutting station disposed downstream of the forming station along the machine direction, the cutting station arranged with respect to the conveyor such that the conveyor carries the cementitious board past the cutting station, the cutting station including a knife configured to periodically cut the cementitious board along the cross-machine direction to define a series of board segments as the cementitious board moves along the machine direction past the cutting station, wherein the thermal imaging device is disposed along the machine direction between the forming station and the cutting station;

wherein the void detecting program includes a thermal analysis module configured to analyze the thermal image data to identify each void defined within the portion of the cementitious board between the pair of cover sheets that is greater than a predetermined size, wherein the void detecting program is configured to track a lateral location of each identified void along the cross-machine direction relative to the first and second edge segments of the portion of the cementitious board, and wherein the void detecting program is configured to group each identified void into one of a first edge area, a second edge area, and a field area, the first edge area extending a predetermined distance from the first edge segment toward the second edge segment along the cross-machine direction, the second edge area extending a predetermined distance from the second edge segment toward the first edge segment along the cross-machine direction, and the field area laterally interposed between the first edge area and the second edge area along the cross-machine direction, the first edge area, the second edge area, and the field area each extending along the machine direction from a leading end to a trailing end of the portion of the cementitious board, the first and second edge area being configured to include respectively therein the first and second edges of the cementitious core.

2. The system for manufacturing according to claim 1, wherein the thermal imaging device is positioned relative to the cementitious board and the field of view of the thermal imaging device is configured such that the cross-machine view distance of the thermal imaging device is greater than a cross-machine board distance of the portion of the cementitious board, the cross-machine board distance measured along the cross-machine direction between the first and second edge segments of the portion of the cementitious board, the thermal image data including at least one edge crop portion defined between one of first and second lateral thermogram edges extending along the machine direction and the first and second edge segments, respectively, of the portion of the cementitious board closest to said lateral thermogram edge, and wherein the void detecting program includes a digital thermogram sizing module configured to exclude each edge crop portion from the void detection analysis of the thermal image data.

3. The system for manufacturing according to claim 1, wherein the thermal image data includes a temperature value for each of a plurality of digital pixels in the field of view, and the thermal analysis module of the void detecting program is configured to:

compute an average temperature for a number of the temperature values corresponding to a set of the digital pixels covering an analyzed portion of the field of view, compare each temperature value in the set of the digital pixels with the average temperature, for each digital pixel in the set of the digital pixels, identify the digital pixel as a void pixel when the temperature value of the digital pixel is a predetermined amount less than the average temperature, group adjacent void pixels together to determine the size of a given void.

4. The system for manufacturing according to claim 1, wherein the void detecting program is configured to:

group each identified void into one of a number of different size ranges.

5. The system for manufacturing according to claim 1, wherein the portion of the cementitious board comprises a first portion, the thermal image data of the first portion of the cementitious board comprises a first set of thermal image data, the system further comprising:

a controller, the controller in operable arrangement with the thermal imaging device, the controller configured to selectively operate the thermal imaging device to generate a second set of thermal image data corresponding to a second portion of the cementitious board, the second portion of the cementitious board in offset longitudinal relationship with the first portion along the machine direction.

6. The system for manufacturing according to claim 5, wherein the controller is configured to selectively operate the thermal imaging device to generate a series of digital thermograms of a number of consecutively-sequenced portions of the cementitious board as the cementitious board passes underneath the thermal imaging device, each portion of the cementitious board including a leading end and a trailing end, the leading end of each portion in spaced relationship to the respective trailing end along the machine direction, the leading end of each respective trailing portion of the consecutively-sequenced portions being substantially aligned with the trailing end of the respective leading portion of the consecutively-sequenced portions.

7. The system for manufacturing according to claim 1, wherein the thermal imaging device is positioned relative to the cementitious board and the field of view of the thermal imaging device is configured such that the cross-machine view distance of the thermal imaging device is greater than a cross-machine board distance of the portion of the cementitious board, wherein the conveyor has a conveyor longitudinal midline, the cross-machine view distance having a transverse midpoint along the cross-machine direction, the transverse midpoint of the field of view of the thermal imaging device being substantially aligned with the conveyor longitudinal midline of the conveyor.

8. A method of manufacturing a cementitious board, the method comprising:

conveying the cementitious board along a machine direction away from a forming station, the cementitious board having first and second edge segments, the first and second edge segments disposed in lateral spaced relationship to each other along a cross-machine direction, the cross-machine direction being perpendicular to the machine direction, the first and second edge segments of the cementitious board extending along the machine direction, the cementitious board having a cementitious core interposed between a pair of cover sheets, the cementitious core comprising a cementitious slurry undergoing an exothermic reaction, the cementitious core including a main portion and first and second edges, the main portion being laterally interposed between the first and second edges, the main portion being made from a main slurry, and the first and second edges being made from an edge slurry, the edge slurry being relatively denser than the main slurry;

using a thermal imaging device to generate a digital thermogram of a portion of the cementitious board as the cementitious board is conveyed past the thermal imaging device, the thermal imaging device disposed downstream of the forming station along the machine direction, the thermal imaging device having a field of view with a cross-machine view distance measured along the cross-machine direction, the cross-machine view distance of the thermal imaging device configured such that the digital thermogram includes both of the first and second edge segments of the portion of the cementitious board;

transmitting the digital thermogram to a processor;

executing a void detecting program stored upon a non-transitory, computer-readable medium using the processor to subject the digital thermogram to void detection analysis, the void detection analysis including:
  (i) identifying each void defined within the portion of the cementitious board between the pair of cover sheets that is greater than a predetermined size,
  (ii) tracking a lateral location of each identified void along the cross-machine direction relative to the first and second edge segments of the portion of the cementitious board, and
  (iii) grouping each identified void into one of a first edge area, a second edge area, and a field area, the first edge area extending a predetermined distance from the first edge segment toward the second edge segment along the cross-machine direction, the second edge area extending a predetermined distance from the second edge segment toward the first edge segment along the cross-machine direction, and the field area laterally interposed between the first edge area and the second edge area along the cross-machine direction, the first edge area, the second edge area, and the field area each extending along the machine direction from a leading end to a trailing end of the portion of the cementitious board, the first and second edge area being configured to include respectively therein the first and second edges of the cementitious core;

periodically cutting, at a cutting station, the cementitious board along the cross-machine direction to define a series of board segments as the cementitious board moves along the machine direction past the cutting station, wherein the thermal imaging device is disposed along the machine direction between the forming station and the cutting station.

9. The method of manufacturing according to claim 8, wherein the thermal imaging device is positioned relative to the cementitious board and the field of view of the thermal imaging device is configured such that the cross-machine view distance of the thermal imaging device is greater than a cross-machine board distance of the portion of the cementitious board, the cross-machine board distance measured along the cross-machine direction between, the first and second edge segments of the portion of the cementitious board, the digital thermogram including at least one edge crop portion defined between one of first and second lateral thermogram edges extending along the machine direction and the first and second edge segments, respectively, of the portion of the cementitious board closest to said lateral thermogram edge, and wherein the void detecting program excludes each edge crop portion from the void detection analysis of the digital thermogram.

10. The method of manufacturing according to claim 8, wherein the digital thermogram includes a temperature value for each of a plurality of digital pixels in the digital thermogram, and the void detection analysis includes:
  computing an average temperature for a number of temperature values generated respectively corresponding to the digital pixels within an array of the digital pixels covering an analyzed portion of the digital thermogram,
  comparing each temperature value in the array of digital pixels with the average temperature,
  for each digital pixel in the array of digital pixels, identifying the digital pixel as a void pixel when the temperature value of the digital pixel is a predetermined amount less than the average temperature,
  grouping adjacent void pixels together to determine the size of a given void.

11. The method of manufacturing according to claim 8, wherein the void detection analysis includes:
  grouping each identified void into one of a number of different size ranges.

12. The method of manufacturing according to claim 8, wherein the portion of the cementitious board comprises a first portion, the digital thermogram of the first portion of the cementitious board comprises a first digital thermogram, the method further comprising:
  using the thermal imaging device to generate a second digital thermogram of a second portion of the cementitious board, the second portion of the cementitious board in offset longitudinal relationship with the first portion along the machine direction.

13. The method of manufacturing according to claim 12, wherein conveying the cementitious board along the machine direction includes lateral movement of the cementitious board in the cross-machine direction such that first and second edge segments of the second portion of the cementitious board have a different lateral position when the second portion is within the field of view of the thermal imaging device relative to the respective first edge segments when the first portion of the cementitious board is within the field of view.

14. The method of manufacturing according to claim 13, wherein the field of view of the thermal imaging device is configured such that both of the first and second edge segments of the cementitious board within the second portion of the cementitious board are included in the second digital thermogram.

15. The method of manufacturing according to claim 12, wherein the first portion of the cementitious board includes a first leading end and a first trailing end, the first leading end and the first trailing end each extending along the cross-machine direction between the first and second edge segments of the first portion, the first leading end in spaced relationship to the first trailing end along the machine direction, and wherein the second portion of the cementitious board includes a second leading end and a second trailing end, the second leading end and the second trailing end each extending along the cross-machine direction between the first and second edge segments thereof, the second leading end in spaced relationship to the second trailing end along the machine direction, the second leading end being substantially aligned with the first trailing end.

16. The method of manufacturing according to claim 8, further comprising:
   using the thermal imaging device to generate a series of digital thermograms of a number of consecutively-sequenced portions of the cementitious board as the cementitious board passes underneath the thermal imaging device, each portion of the cementitious board including a leading end and a trailing end, the leading end of each portion in spaced relationship to the respective trailing end along the machine direction, the leading end of each respective trailing portion of the consecutively-sequenced portions being substantially aligned with the trailing end of the respective leading portion of the consecutively-sequenced portions.

17. The method of manufacturing according to claim 16, wherein the consecutively-sequenced portions have an aggregated area measured along the machine direction and the cross-machine direction, and the void detection analysis includes aggregating each void greater than the predetermined size in each of the consecutively-sequenced portions to determine an aggregated void number for the aggregated area.

* * * * *